United States Patent
Findeisen et al.

(10) Patent No.: US 10,439,541 B2
(45) Date of Patent: Oct. 8, 2019

(54) VEHICLE WITH ELECTRICAL MACHINE AND METHOD FOR OPERATING THE SAME

(71) Applicant: Bayerische Motoren Werke Aktiengesellschaft, Munich (DE)

(72) Inventors: Daniel Findeisen, Erding (DE); Dominik Hecker, Munich (DE); Matthias Gorka, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/478,337

(22) Filed: Sep. 5, 2014

(65) Prior Publication Data
US 2014/0375232 A1    Dec. 25, 2014

Related U.S. Application Data

(63) Continuation of application No. PCT/EP2013/053232, filed on Feb. 19, 2013.

(30) Foreign Application Priority Data

Mar. 6, 2012  (DE) .......................... 10 2012 203 528

(51) Int. Cl.
*H02K 3/12*   (2006.01)
*H02K 11/33*   (2016.01)
(Continued)

(52) U.S. Cl.
CPC ............ *H02P 27/00* (2013.01); *B60L 15/007* (2013.01); *B60L 50/51* (2019.02); *B60L 58/20* (2019.02);
(Continued)

(58) Field of Classification Search
CPC .......... H02P 29/007; H02P 6/182; B60L 7/14
See application file for complete search history.

(56) References Cited

U.S. PATENT DOCUMENTS 5,608,616 A * 3/1997 Umeda ............... H01L 29/1608
363/132
5,838,135 A * 11/1998 Satake .................. H02K 16/00
318/771

(Continued)

FOREIGN PATENT DOCUMENTS

DE          102 44 229 A1    4/2003
DE    10 2005 015 658 A1    1/2007
(Continued)

OTHER PUBLICATIONS

"Wye start/delta run 101", Product service bulletin, May 2003, Jim Bryan, Emerson motor technologies (Year: 2003).*
(Continued)

*Primary Examiner* — Bickey Dhakal
*Assistant Examiner* — Charles S Laughlin
(74) *Attorney, Agent, or Firm* — Crowell & Moring LLP

(57) ABSTRACT

A vehicle is provided with a multiphase electrical machine, a first onboard electrical sub-system having a first nominal DC voltage, and a second onboard electrical sub-system having a second nominal DC voltage. The electrical machine includes a rotor, a first stator system and a second stator system. The first onboard electrical sub-system includes a first inverter with a first link capacitor. The first stator system is associated with the first inverter. The second onboard electrical sub-system includes a second inverter with a second link capacitor. The second stator system is associated with the second inverter. The first stator system is configured in a star configuration. The second stator system is configured in a star configuration or in a delta configuration. A (Continued)

transfer circuit connects the star point of the first stator system to a higher potential of the second onboard electrical sub-system.

18 Claims, 7 Drawing Sheets

(51) Int. Cl.
- *H02P 9/24* (2006.01)
- *H02P 27/00* (2006.01)
- *B60L 15/00* (2006.01)
- *H02P 25/22* (2006.01)
- *B60L 50/51* (2019.01)
- *B60L 58/20* (2019.01)

(52) U.S. Cl.
CPC .......... *H02P 25/22* (2013.01); *B60L 2210/12* (2013.01); *B60L 2210/14* (2013.01); *B60L 2220/54* (2013.01); *B60L 2220/56* (2013.01); *B60L 2220/58* (2013.01); *Y02T 10/641* (2013.01); *Y02T 10/645* (2013.01); *Y02T 10/7005* (2013.01); *Y02T 10/7066* (2013.01); *Y02T 10/7225* (2013.01); *Y02T 10/7233* (2013.01)

(56) References Cited

U.S. PATENT DOCUMENTS

| | | | |
|---|---|---|---|
| 6,806,671 B2 | 10/2004 | Kusaka et al. | |
| 7,579,792 B2* | 8/2009 | Nagashima | B60L 11/12 318/105 |
| 7,733,038 B2 | 6/2010 | Franke | |
| 7,764,051 B2* | 7/2010 | Ishikawa | B60K 6/26 322/29 |
| 7,982,426 B2* | 7/2011 | Itoh | H02M 7/5387 318/108 |
| 8,091,665 B2 | 1/2012 | Kuno | |
| 8,115,433 B2* | 2/2012 | Welchko | B60L 11/1803 318/400.11 |
| 2006/0164027 A1 | 7/2006 | Welchko et al. | |
| 2007/0090782 A1* | 4/2007 | Endo | B62D 5/046 318/432 |
| 2008/0048605 A1* | 2/2008 | Franke | B60L 11/1868 318/800 |
| 2009/0033252 A1* | 2/2009 | Smith | B60L 11/1868 318/139 |
| 2009/0033274 A1* | 2/2009 | Perisic | B60L 11/1868 318/771 |
| 2009/0090574 A1* | 4/2009 | Kuno | B60W 20/15 180/65.265 |
| 2009/0096394 A1* | 4/2009 | Taniguchi | H02M 1/32 318/400.09 |
| 2011/0215772 A1* | 9/2011 | Sheng | H02P 9/007 322/21 |
| 2013/0049650 A1 | 2/2013 | Kurfiss et al. | |

FOREIGN PATENT DOCUMENTS

| | | |
|---|---|---|
| DE | 10 2010 002 318 A1 | 8/2011 |
| EP | 1 508 955 A1 | 2/2005 |
| EP | 1 947 759 A2 | 7/2008 |
| WO | WO 2011/092099 A1 | 8/2011 |

OTHER PUBLICATIONS

German language Search Report dated Sep. 17, 2012, with English translation (Nine (9) pages).

International Search Report (PCT/ISA/210) dated Sep. 27, 2013, with English translation (Eight (8) pages).

\* cited by examiner

VEHICLE WITH ELECTRICAL MACHINE AND METHOD FOR OPERATING THE SAME

CROSS REFERENCE TO RELATED APPLICATIONS

This application is a continuation of PCT International Application No. PCT/EP2013/053232, filed Feb. 19, 2013, which claims priority under 35 U.S.C. § 119 from German Patent Application No. 10 2012 203 528.1, filed Mar. 6, 2012, the entire disclosures of which are herein expressly incorporated by reference.

BACKGROUND AND SUMMARY OF THE INVENTION

The invention relates to a vehicle with a multiphase electrical machine, with a first onboard electrical sub-system having a first nominal DC voltage and with a second onboard electrical sub-system having a second nominal DC voltage. The electrical machine comprises a rotor, a first stator system and a second stator system. The first onboard electrical sub-system comprises a first inverter with a first link capacitor. The first stator system is associated with the first inverter. The second onboard electrical sub-system comprises a second inverter with a second link capacitor. The second stator system is associated with the second inverter.

Usually, components used in a vehicle constitute electrical energy consumers. These consumers are supplied by an onboard power supply with a nominal voltage of 14 volts. A secondary 12 V energy store that assumes the function of a power source or the function of an energy sink in the onboard electrical system, depending on the operational situation, and a 14 V generator, are designed to provide electrical output of 2-3 kW in the vehicle.

If several consumer loads with a high power requirement are integrated into the onboard electrical system of the vehicle, the onboard electrical system can have two onboard electrical sub-systems. Then, a DC chopper circuit transfers electrical power between the two onboard electrical sub-systems. Besides at least one energy store per onboard electrical sub-system, the electrical machine, which can also be motor-driven in a vehicle with an electrified drive train, also has the function as an electrical power source or sink in the vehicle. Such an onboard electrical system topology is depicted, for example, in DE 102 44 229 A1.

It is an object of the invention to provide an improved vehicle with an electrical machine and two onboard electrical sub-systems, as well as a method for operating the electrical machine.

This and other objects are achieved by a vehicle with a multiphase electrical machine, with a first onboard electrical sub-system having a first nominal DC voltage and with a second onboard electrical sub-system having a second nominal DC voltage, wherein the electrical machine comprises a rotor, a first stator system and a second stator system. The first onboard electrical sub-system comprises a first inverter with a first link capacitor. The first stator system is associated with the first inverter. The second onboard electrical sub-system comprises a second inverter with a second link capacitor. The second stator system is associated with the second inverter. The first stator system is embodied in a star configuration. The second stator system is embodied in a star configuration or a delta configuration. A transfer circuit electrically connects the star point of the first stator system to the higher potential of the second onboard electrical sub-system.

Thus, according to the invention, the first stator system is embodied in a star circuit and the second stator system is embodied in a star circuit or delta circuit, and a transfer circuit connects the star point of the first stator system to the higher potential of the second onboard electrical sub-system. That means that the star point of the first stator system can be coupled with the higher potential of the second onboard electrical sub-system.

According to one preferred embodiment of the invention, the transfer circuit comprises first and second diodes that are connected counter to each other and in series.

Furthermore, the transfer circuit comprises a first switch to which the first diode is connected in parallel or, alternatively, a second switch that is connected to the first diode in parallel.

It is also especially advantageous if the transfer circuit includes the first switch to which the first diode is connected in parallel and the second switch to which the second diode is connected in parallel.

The counter-switched diodes ensure that, when the first switch is open and/or when the second switch is open, the direct electrical coupling between the star point of the first stator system and the higher potential of the second onboard electrical sub-system is ineffective. When the first switch and/or the second switch is closed, there is a direct electrical connection between the star point of the first stator system and the higher potential of the second onboard electrical sub-system in the form of a very low-impedance connection through a series connection of two closed switches or a series connection of a switch and a diode.

In another variant of the invention, the first inverter has three high-side switches and three low-side switches, and the second inverter has three high-side switches and three low-side switches. The three high-side switches of the first inverter and the three low-side switches of the first inverter can be controlled by pulse-width modulation. The three high-side switches of the second inverter and the three low-side switches of the second inverter can be controlled by pulse-width modulation. When the first switch is open and when the second switch is open, the electrical machine can be operated by motor or generator or mixed drive by means of phase-width-modulated control of the high-side switches and of the low-side switches of the first inverter and of the second inverter. A low-side diode and a high-side diode are connected in parallel to the low-side switches and high-side switches, respectively.

This means that the electrical machine can be used with respect to both onboard electrical systems as a generator or a motor—independently of whether the electrical machine of the respective other onboard electrical system is being used as a motor or as a generator at the given time of operation. During operation as a generator, electrical power is fed to the respective onboard electrical system via the respective stator system as a result of a torque applied to the rotor from the outside (e.g., by a combustion engine of the vehicle). During operation as a motor, electrical power is taken from the respective onboard electrical system via the respective stator system and converted into the rotational energy of the rotor, which is taken off of the rotor from the outside (e.g., by a belt-driven consumer of the vehicle) as torque.

It is especially advantageous if the first nominal voltage exceeds the second nominal voltage in the direction of the voltage with respect to a reference voltage in the vehicle, for example, of an electrical mass of the vehicle common to both onboard electrical sub-systems. The electrical machine can be operated as a DC step-down converter between the first onboard electrical sub-system and the second onboard electrical sub-system when the rotor is at a standstill.

The electrical machine can be operated as a DC step-down converter by opening the low-side switches of the second inverter, opening the high-side switches of the second inverter, opening the low-side switches of the first inverter, and controlling the high-side switches of the first inverter by pulse-width modulation.

To reduce conduction losses, the low-side switches of the first inverter can also be controlled by pulse-width modulation complementarily to the high-side switches of the first inverter. In order to prevent a bridge short circuit between the high- and low-side switches, dead time is provided in which both the high-side and low-side switches are open.

In addition, the excitation winding of the rotor can be electrically short-circuited.

If the high-side switches of the first inverter are closed, the differential voltage between the first onboard electrical sub-system and the second onboard electrical sub-system is pending via the effective inductor that is formed by the 3 inductors of the first stator system connected in parallel. During this make-time, the current increases linearly in the inductor, and the mean value thereof can be tapped as direct current by a load. During the switch-off phase, the inductor dissipates the energy content, whereas the link capacitor of the second onboard electrical sub-system is charged. To form a free path for the current, the low-side switches of the first inverter can either be closed or remain open. In the latter case, the low-side diodes of the first inverter are conductive.

In addition, it is especially advantageous if the first nominal voltage exceeds the second nominal voltage in the direction of a higher nominal voltage and the electrical machine can be operated as a DC step-up converter from the second onboard electrical sub-system to the first onboard electrical sub-system when the rotor is at a standstill.

The electrical machine can be operated as a DC step-up converter by opening the low-side switches of the second inverter, opening the high-side switches of the second inverter, opening the high-side switches of the first inverter, and controlling the low-side switches of the first inverter by pulse-width modulation.

To reduce conduction losses, the high-side switches of the first inverter can also be controlled by pulse-width modulation complementarily to the low-side switches of the first inverter. In order to prevent a bridge short circuit between the high- and low-side switches, dead time is provided in which both the high-side and low-side switches are open.

In addition, the excitation winding of the rotor can be electrically short-circuited.

If the low-side switches of the first inverter are closed, the voltage of the second onboard electrical sub-system is pending via the effective inductor that is formed by the 3 inductors of the first stator system connected in parallel. During this make-time, the current increases linearly, and the inductor gains in energy content. At the same time, the high-side diodes of the first inverter close, so that the voltage at the link capacitor of the first onboard electrical sub-system cannot be aligned with the voltage of the second onboard electrical sub-system. During the switch-off phase, the inductor dissipates the energy content, and the link capacitor of the first onboard electrical sub-system is charged. The high-side switches of the first inverter can either be switched on or remain switched off. In the latter case, the high-side diodes of the first inverter are conductive.

Other objects, advantages and novel features of the present invention will become apparent from the following detailed description of one or more preferred embodiments when considered in conjunction with the accompanying drawings.

BRIEF DESCRIPTION OF THE DRAWINGS

In the drawing figures, the same reference symbols refer to the same technical features.

DETAILED DESCRIPTION OF THE DRAWINGS

Figure 1:
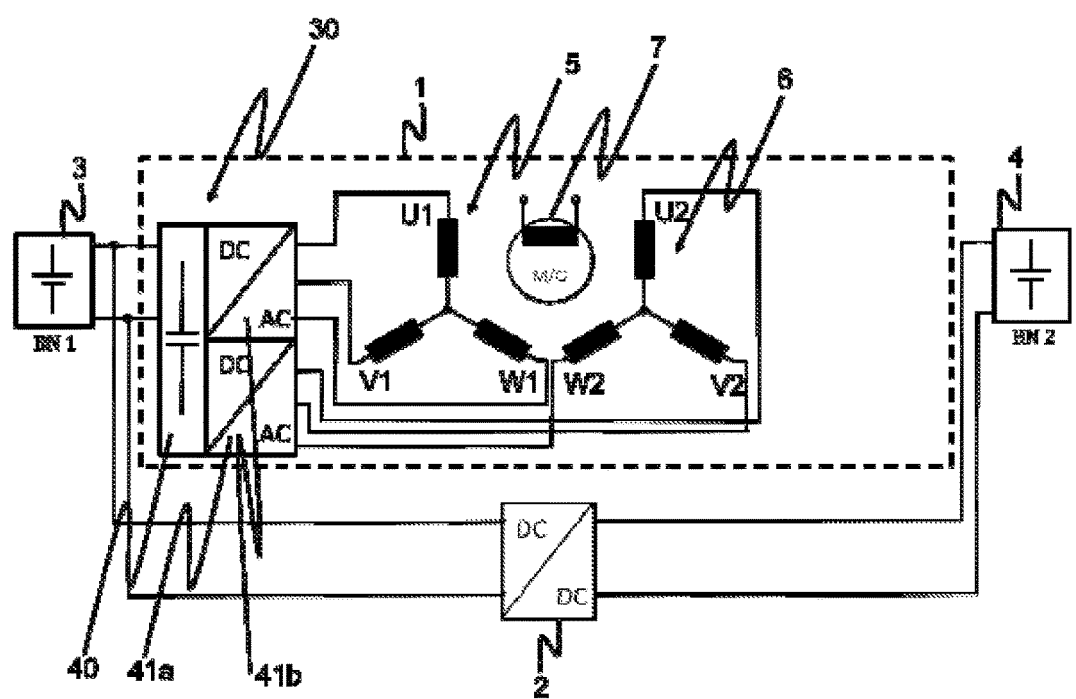
FIG. 1 is a schematic diagram of a vehicle with electrical machine and two onboard electrical sub-systems according to the prior art.

According to the prior art, at least four components are required for a dual-voltage onboard electrical system of a vehicle, in addition to the two onboard electrical systems; see FIG. 1. These are an electrical machine (1), a DC chopper (2) between the two onboard electrical systems (BN1, BN2) and an energy store in each of the two onboard electrical systems (3, 4). The electrical machine can consist of two 3-phase stator systems that can be of substantially identical construction. The two stator systems can also be connected to each other at a certain electrical angle.

The onboard electrical system (BN2) can be a conventional 12 V onboard electrical system, for example, and the onboard electrical system (BN1) an onboard electrical system with a higher nominal voltage. Alternatively, the onboard electrical system (BN1) and the onboard electrical system (BN2) can have a comparable nominal voltage of, for example, 400 V, if different energy stores, such as a lithium ion battery and a double-layer capacitor, are combined together, for example. Both onboard electrical systems have a higher electrical potential, each of which is substantially determined by the two nominal voltages, and a lower electrical potential that is common to both onboard electrical systems and is optionally connected to the mass of the vehicle. The actual voltages of the respective higher electrical potentials of the two onboard electrical systems can deviate from the respective nominal voltages of the two onboard electrical systems at any given time during operation.

The DC chopper (2) enables the uni- and bi-directional transfer of power and energy between the two onboard electrical systems independently of the state of the electrical machine (1).

According to the prior art, a multiphase electrical machine (engine), for example a 6-phase machine with two three-phase windings in a star configuration (5, 6), can be used as an electrical machine. The stator is operated over an inverter system (30) and a link capacitor (40), with a DC-AC inverter (41a, 41b) being associated with one of the two 3-phase coil systems. Depending on the type of electrical machine, the rotor (7) can be equipped either exclusively with permanent magnets, an excitation winding with inductive transmitter and rotating rectifier, or it can have a slip ring system or be embodied as a short-circuit cage rotor. The electrical machine can be operated as a generator (E-mode) or as a motor (M-mode).

Exemplary embodiments of the invention follow from FIGS. 2 to 6. An electrical machine with a first 3-phase coil system (U1', V1', W1') in a star configuration (5) and a second 3-phase coil system (U2", V2", W2") in a delta configuration (15) and a rotor (7) are integrated into a vehicle with at least two onboard electrical sub-systems (BN1', BN2'). According to one alternative embodiment, the second stator system can also be arranged in a star circuit (see FIG. 7). Each of the two onboard electrical sub-systems has at least one electrical energy store (3', 4'). Furthermore, both onboard electrical systems have a higher electrical potential, each of which is substantially determined by the two nominal voltages, and a lower electrical potential that is common to both onboard electrical systems and is optionally connected to the mass of the vehicle. The actual voltages of the respective higher electrical potentials of the two onboard electrical systems can deviate from the respective nominal voltages of the two onboard electrical systems at any given time during operation.

Without constituting a restriction of the generality, the onboard electrical sub-system (BN2') with the smaller nominal voltage range is associated with the second coil system in a star or delta configuration, and the onboard electrical sub-system with the higher nominal voltage range (BN1') is associated with the first coil system in the star configuration. The transfer circuit is connected to the star point of the first stator system.

The star point (connection) of the coil system (5) is connected via an electrical path (16) to the higher potential of the onboard electrical system (BN2'). The electrical path has two counter-switched diodes (17, 18) connected in series and a switch (17a, 18a) connected in parallel to the diode (17) (see FIG. 2) or to the diode (18) (see FIG. 3). FIG. 4 shows a configuration with two switches (17a, 18a), each of which is connected in parallel to one of the diodes (17, 18).

The diodes (17, 18) and the switches (17a, 18a) can be embodied as MOSFETs, the diodes (17, 18) being formed by the substrate diodes of the MOSFET. The electrical path (16) is designed such that it transfers electrical power up to a certain level. This can be ensured, for example, by use of an appropriate cable cross section. Alternatively, several electrical paths can also be connected in parallel in order to increase the capacity, with one electrical path corresponding to the design of the electrical path (16).

Each of the two 3-phase coil systems is controlled via a parallel circuit of a link capacitor (11, 12) and an inverter (13, 14).

In FIGS. 2 to 6, the BN1' is connected via the link capacitor (11) and the inverter (13) to the stator system (5), and the BN2' is connected via the link capacitor (12) and the inverter (14) to the stator system (6).

The link capacitors (11, 12) supply the high-frequency alternating component of the machine currents and smooth the output voltage of the electrical machine in generator mode. As a result, the harmonics in the two onboard electrical systems can be reduced.

Each of the two inverters (13, 14) includes six switches with inverter diodes (HS1, HS2, HS3, LS1, LS2, LS3, HS4, HS5, HS6, LS4, LS5, LS6) connected in parallel. Without constituting a restriction of the generality, the switch/freewheeling diode combinations are embodied as MOSFETs, which are also referred to as power switches. IGBTs with freewheeling diode are also preferably used in onboard electrical systems with a high nominal voltage (particularly >>100 V). The switches are connected to the respective coil system in a half-bridge circuit of an inverter that is known to the person skilled in the art. The inverter (13) includes three half-bridges, the first half-bridge being formed by the MOSFETs (HS1, LS1), the second half-bridge being formed by the MOSFETs (HS2, LS2) and the third half-bridge being formed by the MOSFETs (HS3, LS3). The inverter (14) includes three half-bridges, the first half-bridge being formed by the MOSFETs (HS4, LS4), the second half-bridge being formed by the MOSFETs (HS5, LS5) and the third half-bridge being formed by the MOSFETs (HS6, LS6).

Those power switches which are connected to the higher potential of the respective onboard electrical system (HS1, HS2, HS3, HS4, HS5, HS6) are called high-side switches. Those power switches which are connected to the lower potential of the respective onboard electrical system (LS1, LS2, LS3, LS4, LS5, LS6) are called low-side switches. Each of the coil sides of the coil system (5) facing away from the star point is connected to a half-bridge of the inverter (13), i.e., the coils of the coil system (5) are connected on their coil side to the electrical potential that exists respectively between the power switches of a half-bridge. For example, upon closing of the switch (LS3) of the inverter (13), the coil (W1') can be connected to the lower potential of the onboard electrical system (BN1'), and upon closing of the switch (HS2) of the inverter (13), the coil (V1') can be connected to the higher potential of the onboard electrical system (BN1').

Each of the delta points of the coil system (15) in the delta configuration is connected to a half-bridge of the inverter (14), i.e., the delta points of the coil system (15) are connected to an electrical potential that exists respectively between the power switches of a half-bridge.

In another embodiment, in which the coil system (15) is embodied in a star configuration, each of the coil sides facing away from the star point is connected to a half-bridge of the inverter (14), i.e., the coil sides of the coil system (15) facing away from the star point are connected to the electrical potential that exists respectively between the power switches of a half-bridge.

The switches and freewheeling diodes have sufficient blocking voltage resistance corresponding, for example, to twice the value of the nominal voltage of the onboard electrical system with which the inverter is associated.

In the exemplary embodiments according to FIGS. 2 to 6, the BN2' is, without constituting a restriction of the generality, embodied as a conventional 14 V onboard electrical system. The energy store (4) can, for example, be a lead/acid battery using AGM technology with a nominal voltage of 12

V. The BN1' is located at a higher nominal voltage in comparison to the BN2', namely 48 V, with a 48 V energy store that can be embodied, for example, in lithium ion technology. As regards the voltages of BN1' and BN2', as well as of the respective energy stores, any configuration is conceivable in which the nominal voltage of BN1' exceeds the nominal voltage of BN2'.

The two 3-phase stator systems (5, 15) are adapted to the two onboard electrical systems (BN1', BN2'), for example by means of a different number of windings of the coils (U2", V2", W2") in comparison to the coils (U1', V1', W1') according to the design. This means that the coil system (U2", V2", W2") is designed to have a lower-impedance compared to the coil system (U1', V1', W1') in order to reduce conduction losses at a comparable power conversion level and a lower voltage on average and higher currents on average.

Figure 2:
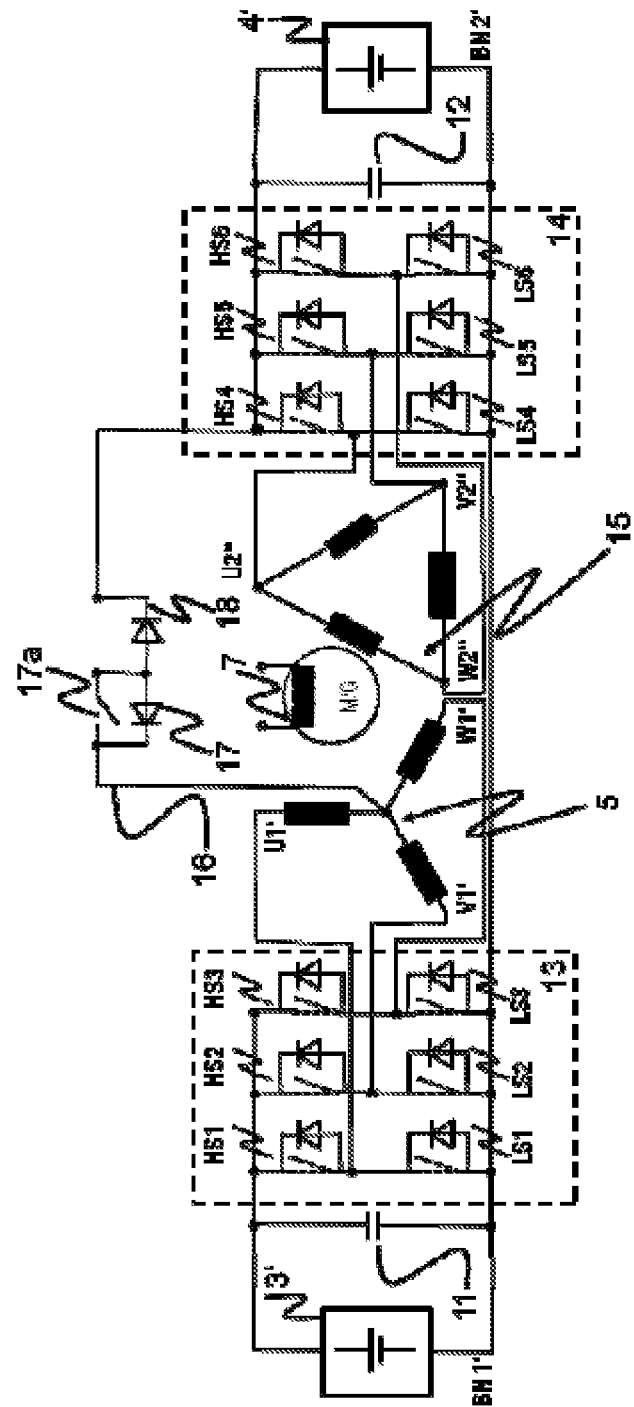
FIG. 2 is a schematic diagram of a vehicle with electrical machine, two onboard electrical sub-systems and with a transfer circuit suitable for buck mode and with the electrical machine in normal mode.
Figure 3:
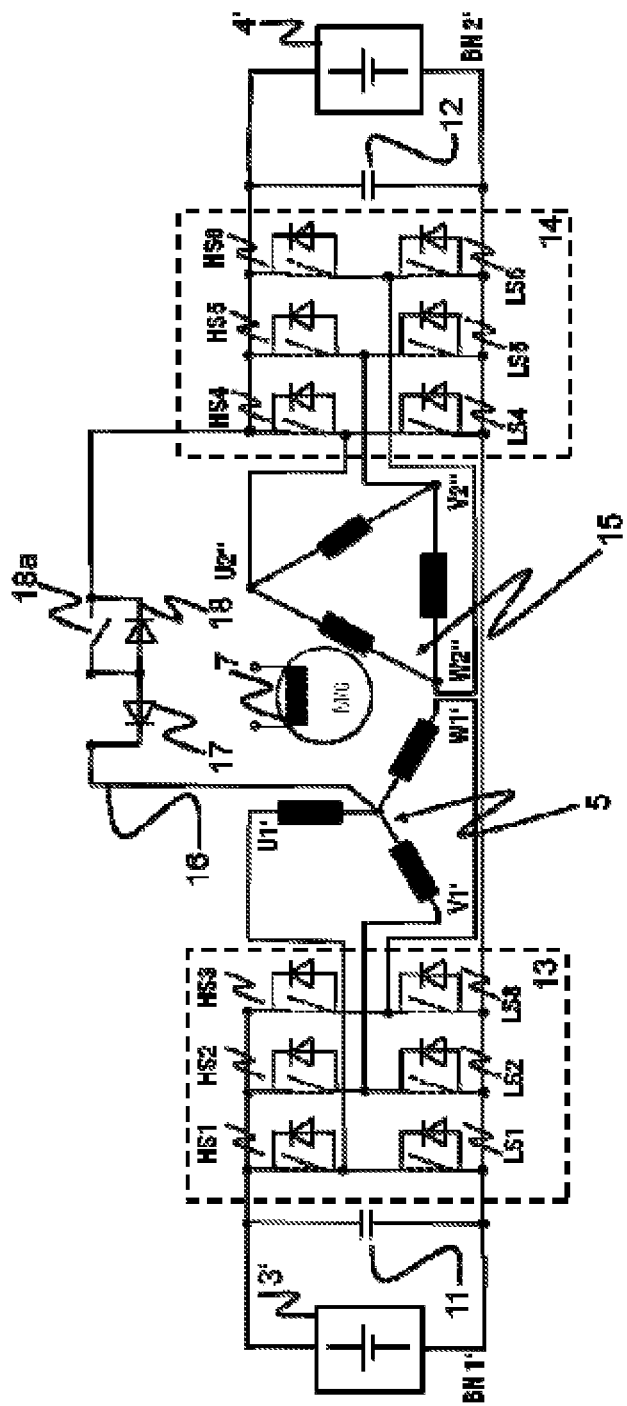
FIG. 3 is a schematic diagram of a vehicle with electrical machine, two onboard electrical sub-systems and with a transfer circuit suitable for boost mode and with the electrical machine in normal mode.
Figure 4:
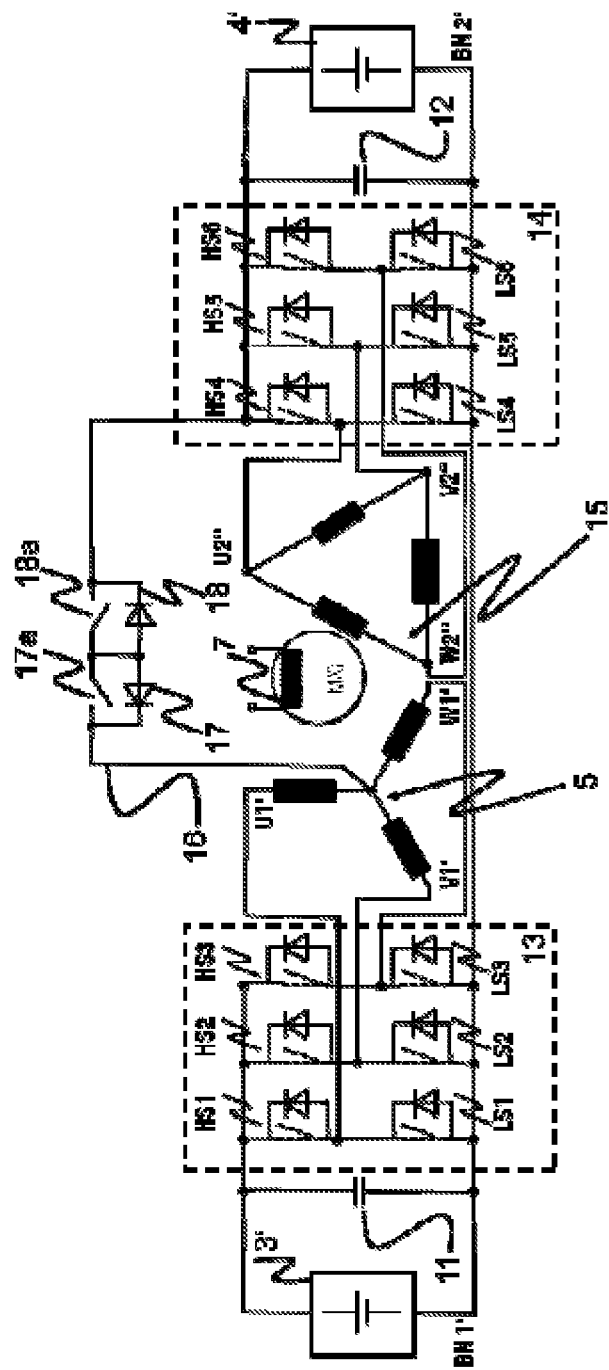
FIG. 4 is a schematic diagram of a vehicle with electrical machine, two onboard electrical sub-systems and with a transfer circuit suitable for buck mode and boost mode and with the electrical machine in normal mode.

According to FIGS. 2 to 4, the electrical machine can be operated with the switches (17a, 18a) open. In this state, no power is transferred between the onboard electrical systems BN1' and BN2'. Due to the blocking effect of the two substrate diodes (17, 18) of the MOSFETs, there is no direct electrical coupling between the two coil systems via the path (16). The electrical machine can be operated as a motor or as a generator. The two stator systems are controlled, for example, by a 3-phase, pulse width-modulated control of the inverters (13, 14) by means of field-oriented regulation and, for example, space vector modulation of the switch positions of the low-side switches and the high-side switches. The pulse width-controlled switching position of the power switches is indicated in FIGS. 1 to 4 by depictions of the switch positions using broken lines. A microprocessor or FPGA, for example, can be used for the control. The parametric values such as, for example, torque, rotational speed, voltage or output can be prescribed, for example, by way of a control unit of the vehicle.

When the switches (17a, 18a) are open, the electrical machine can also be operated in a mixed mode, which is to say, for example, it can be operated as a motor with respect to the onboard electrical system (BN1') and as a generator with respect to the onboard electrical system (BN2'). This means that, in this case, power is transferred from the onboard electrical system (BN1') to the onboard electrical system (BN2'). This power transfer mode can be executed independently of whether torque is being tapped by a mechanical consumer on the shaft of the rotor or if torque is being applied to the shaft by a motor. If the rotor is neither giving off torque to the outside nor taking on torque, energy is merely transferred between the two onboard electrical sub-systems while the electrical machine is running.

If the electrical machine is running in motor mode with respect to BN1', for example, and in generator mode with respect to the onboard electrical system BN2', power is transferred from the onboard electrical system (BN1') to the electrical system (BN2'). This power transfer mode can be executed independently of whether torque is being tapped by a mechanical consumer on the shaft of the rotor or if torque is being applied to the shaft by a motor. If the rotor is neither giving off torque to the outside nor taking on torque, energy is merely transferred between the two onboard electrical sub-systems while the electrical machine is running.

According to another operational state of the electrical machine shown in FIGS. 2 and 4 with an unexcited rotor at a standstill, which is to say without an excitation voltage being applied to the rotor, the electrical machine can be operated as a step-down converter, i.e., for transferring electrical power from BN1' to BN2'. This mode is referred to as buck mode and is shown in FIG. 5.

Figure 5:
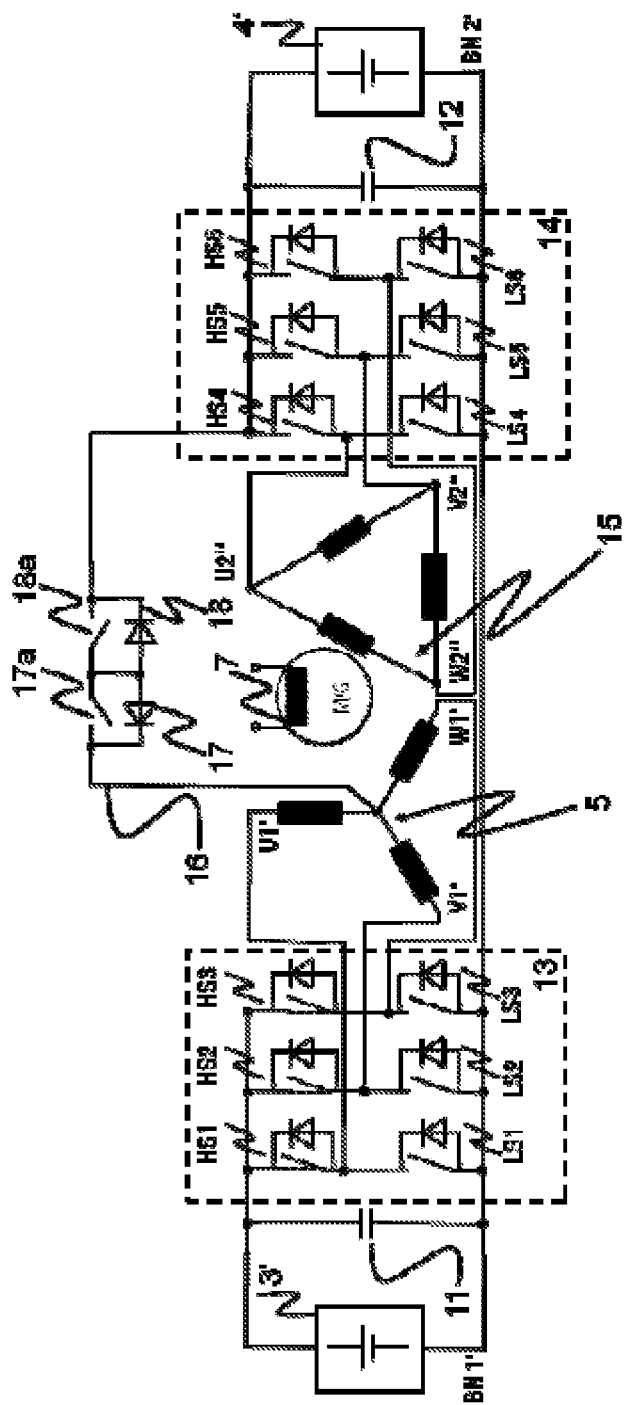
FIG. 5 is a schematic diagram of a vehicle with electrical machine, two onboard electrical sub-systems and with a transfer circuit suitable for buck mode and boost mode and with the electrical machine in buck mode.

In buck mode according to FIG. 5, the two switches (17a, 18a) are permanently closed. In buck mode for the embodiment according to FIG. 2, the switch (17a) is permanently closed. This means that, in buck mode, the star point of the stator system (5) lies at the higher electrical potential of the onboard electrical system (BN2'). All of the switches of the inverter (14) are permanently open. In addition, the excitation circuit of the rotor can be short-circuited in order to ensure that the rotor always remains stationary in buck mode. Movement on the part of the rotor as a result of electromagnetically induced forces in the inductive system of the rotor results in unnecessary energy loss. If the rotor shaft is rigidly connected to the crank shaft of the vehicle, for example, or of a transmission shaft, such induction movements would also mean undesired drive torque of the vehicle in this operational state.

The switches (HS1, HS2, HS3) are controlled synchronously by pulse-width modulation. Since the inductances of the individual phases of the stator systems at a standstill can vary depending on the rotor position due to residual magnetization as a result of optionally present magnets or remanence in the stator lamination, the pulse-width-modulated duty factor of the switches (HS1, HS2, HS3) can vary. The switches (LS1, LS2, LS3) are permanently open or operated complementarily to the switches (HS1, HS2, HS3). The inverter (13) can be controlled, for example, by means of a microprocessor or an FPGA, and the voltage, current or output can be prescribed, for example, by a control unit of the vehicle. The ratio of make-time $T_{BUCK}$ and cycle duration $P_{BUCK}$ is referred to as duty factor $D_{BUCK}$. The switching frequency $F_{BUCK}$ refers to the inverse of the cycle duration $P_{BUCK}$; the make-time $T_{BUCK}$ reaches the cycle duration $P_{BUCK}$ as a maximum. In buck mode, one obtains a voltage $U_{BUCK,BN2'}$ in the onboard electrical system BN2', where $U_{BUCK,BN2'} \propto D_{BUCK} \cdot U_{BN1'}$.

Complementary switching means that, in a half-bridge, high-side and low-side switches are switched on alternatingly; for example, if the high-side switch is closed, the low-side switch is open, and vice versa.

Complementary switching brings about lower conduction losses. Conduction losses are to be understood as meaning that a current flows through a semiconductor structure that is not ideal and brings about output losses. Losses result in the diode according to the product of the forward bias of the semiconductor structure and the through current as well as according to the product from the temperature-dependent, differential path resistance and the square of the through current. When using a MOSFET as a switch, the conduction losses arise only as a result of the product of the square of the current and of the temperature-dependent forward resistance of the MOSFET in the on state. When current flows through the MOSFET instead of through the diode, the total conduction loss is therefore less.

Alternatively, besides synchronous pulse width-modulated control, pulse width-modulated control that is shifted by a certain angle is also possible, which is referred to as interleaved mode. Here, the high-side switches (HS1, HS2, HS3) are configured in a 3-phase stator system so as to be phase-shifted by 120°. A rotating field can form as a result on the coil system (U1', V1', W1'). It is advantageous that the ripple current at the link capacitor (12) can be reduced using this method of control.

In the selected example, if the 12 V AGM battery of the BN2' is near its final discharge voltage of 10.5 V and the Li-ion store is near a voltage near its nominal voltage of 48

V, for example, the AGM battery can be charged via the Li-ion store if a nominal charge voltage of 14.4 V is set at the AGM battery by establishing a preset, controllable duty factor of 0.3.

When the rotor is unexcited and at a standstill, i.e., if there is no excitation voltage being applied to the rotor, the electrical machine according to FIGS. 3 and 4 can be operated as a step-up converter, which is to say for transferring electrical power from the BN2' to the BN1'. This mode is called boost mode and is shown in FIG. 6.

Figure 6:
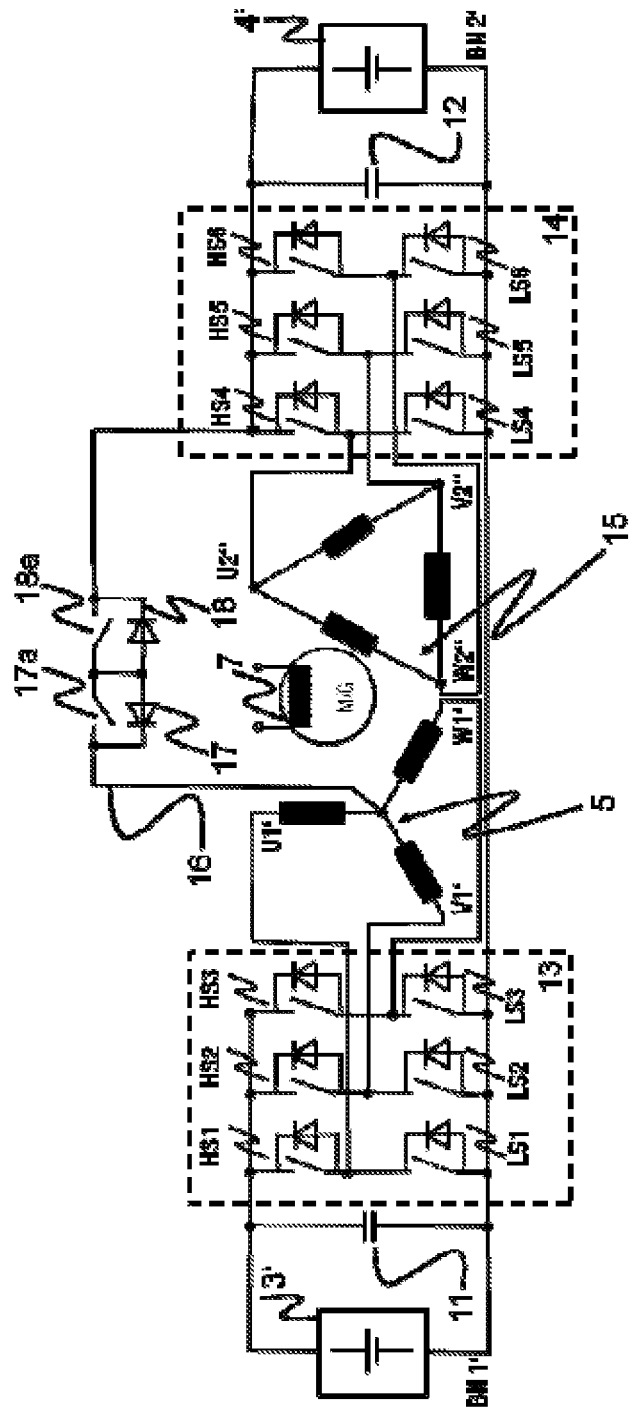
FIG. 6 is a schematic diagram of a vehicle with electrical machine, two onboard electrical sub-systems and with a transfer circuit suitable for buck mode and boost mode and with the electrical machine in boost mode.

In boost mode according to FIG. 6, the two switches (17a, 18a) are permanently closed. This means that, in boost mode, the star point of the stator system (5) lies at the higher electrical potential of the onboard electrical system (BN2'). All of the switches of the inverter (14) are permanently open. In addition, the excitation circuit can be short-circuited in order to ensure that the rotor always remains stationary in boost mode. The switches (HS1, HS2, HS3) are permanently open or controlled complementarily to the switches (LS1, LS2, LS3). The switches (LS1, LS2, LS3) are controlled simultaneously by pulse-width modulation. Since the inductances of the individual phases of the stator systems at a standstill can vary depending on the rotor position due to residual magnetization as a result of optionally present magnets or remanence in the stator lamination, the pulse-width-modulated duty factor of the switches (LS1, LS2, LS3) can also vary.

The ratio of make-time $T_{BOOST}$ and cycle duration $P_{BOOST}$ is referred to as duty factor $D_{BOOST}$. The switching frequency $F_{BOOST}$ refers to the inverse of the cycle duration $P_{BOOST}$; the make-time $T_{BOOST}$ reaches the cycle duration $P_{BOOST}$ as a maximum. In boost mode, one obtains a voltage $U_{BOOST,BN1'}$ in the onboard electrical system BN1', where $U_{BOOST,BN1'} \propto (1/(1-D_{BOOST})) \cdot U_{BN2'}$. The inverter diodes connected in parallel to the open switches (HS1, HS2, HS3) prevent loss of voltage of the onboard electrical system (BN1') at the point in time at which the switches (LS1, LS2, LS3) are closed.

Alternatively, besides synchronous pulse width-modulated control, pulse width-modulated control that is shifted by a certain angle is also possible, which is referred to as interleaved mode. Here, the low-side switches (LS1, LS2, LS3) are configured in a 3-phase stator system so as to be phase-shifted by 120°. A rotating field can form as a result on the coil system (U1', V1', W1'). It is advantageous that the current ripple at the link capacitor (11) can be reduced using this method of control.

In the selected example, if the 48 V Li-ion store is strongly discharged and the AGM battery is sufficiently charged at the same point in time with a voltage of 12 V, the Li-ion store can be charged by the AGM battery if a nominal charge voltage of 60 V is set at the Li-ion store by establishing a preset, controllable duty factor of 0.8. If the Li-ion store has a high charge acceptance and hence a high input power, the duty factor starting at 0.8 must be set to a higher value via the engine control device in order to maintain the nominal charge voltage of 60 V at the Li-ion store as the voltage of the AGM battery drops at the same time.

In the buck mode and boost mode of the electrical machine according to FIG. 5 and FIG. 6, respectively, the windings (U2", V2", W2") are electrically inactive as a step-down converter and as a step-up converter in the function of the electrical machine. This means that the overall usable inductance is limited to the inductances (U1', V1', W1') for any voltage control mode with a stationary rotor in FIG. 5 and FIG. 6.

For each unit of time, more electrical energy can be transmitted from one onboard electrical system to another onboard electrical system with an increasing duty factor $D_{BUCK}$ or duty factor $D_{BOOST}$ with constant switching frequency $F_{BUCK}$ or switching frequency $F_{BOOST}$. The voltage to be applied to the respective other onboard electrical system and hence also the transmission capacity in buck mode and boost mode can therefore be controlled by use of the duty factor parameter.

The advantage of the invention is that power can be transferred between the two onboard electrical systems via the electrical machine and the inverters used to operate the electrical machine. A circuit can be integrated simply into the vehicle. This offers the advantage that, without using a DC chopper (2) like in FIG. 1, energy can be transferred from one onboard electrical sub-system of the vehicle to another onboard electrical sub-system of the vehicle without the need for the electrical machine to be in operation.

Another special advantage is the adjustability of an energy transfer device (buck and/or boost mode) based on the design of the transfer circuit with either one switch or two switches, each of which is connected in parallel to the first and/or second diode.

If bidirectional operation (buck and boost mode) is desired, two switches (17a and 18a) are used (see FIG. 4). This enables current to flow over both closed switches in both directions from onboard electrical system (BN1') to onboard electrical system (BN2') or from onboard electrical system (BN2') to onboard electrical system (BN1').

If only an energy transfer from onboard electrical system (BN1') to onboard electrical system (BN2') is intended to be enabled, the switch (17a) alone is sufficient (see FIG. 2), which is connected in parallel to the first diode (17). This enables current to flow over the closed switch (17a) and the diode (18) (poled in the direction of flow from onboard electrical system (BN1') to onboard electrical system (BN2').

If only an energy transfer from onboard electrical system (BN2') to onboard electrical system (BN1') is intended to be enabled, the switch (18a) alone is sufficient (see FIG. 3), which is connected in parallel to the second diode (18). This enables current to flow over the closed switch (18a) and the diode (17) (poled in the direction of flow from onboard electrical system (BN2') to onboard electrical system (BN1').

Figure 7:
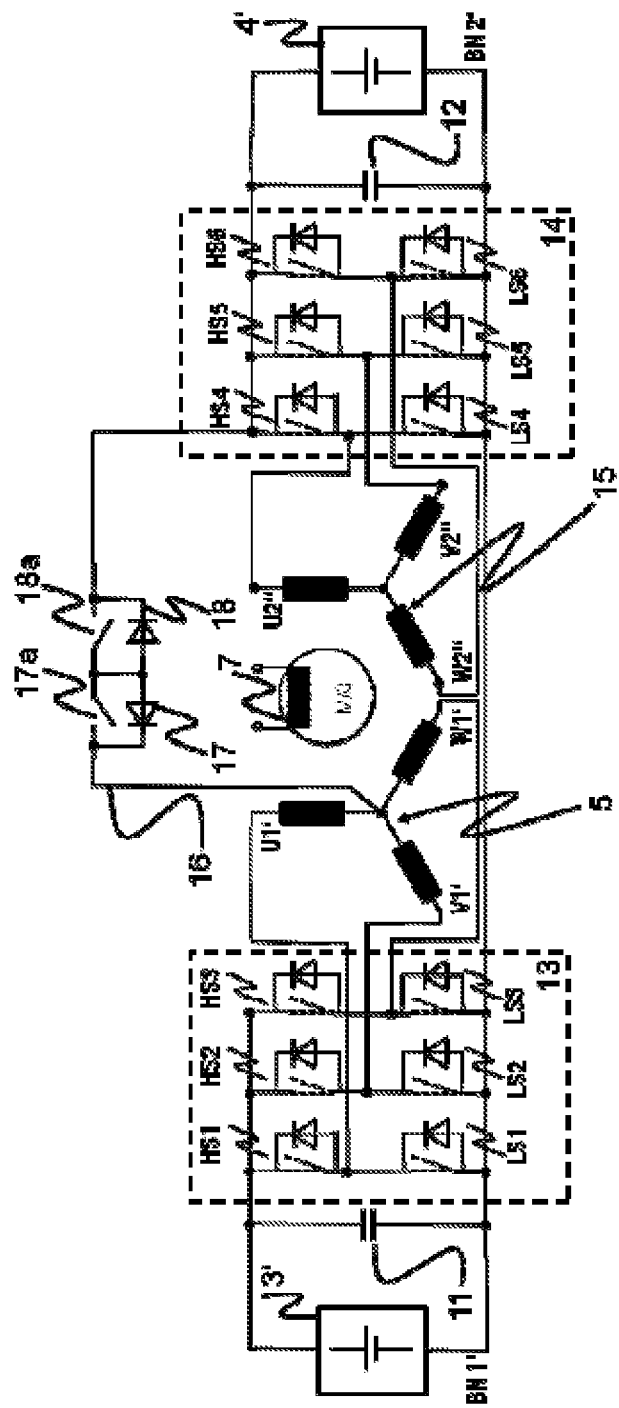
FIG. 7 is a schematic diagram of a vehicle with electrical machine, two onboard electrical sub-systems and with a transfer circuit suitable for buck mode and boost mode, with the electrical machine in normal mode and with two stator systems in star configuration.

According to another embodiment, the second stator system (15) is embodied in a star configuration of the coils (U2", V2", W2") (see FIG. 7). The delta configuration in FIGS. 2 to 6 can, without constituting a restriction of the generality, be replaced by a stator system in star configuration for normal mode, buck mode and boost mode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a multi-phase electrical machine, the multi-phase electrical machine comprising a rotor, a first stator system and a second stator system;
   a first onboard electrical sub-system having a first nominal DC voltage;
   a second onboard electrical sub-system having a second nominal DC voltage;

wherein the first onboard electrical sub-system comprises a first inverter with a first link capacitor, the first stator system being associated with the first inverter;

wherein the second onboard electrical sub-system comprises a second inverter with a second link capacitor, the second stator system being associated with the second inverter;

wherein the first stator system is in a star configuration, the second stator system is in a star or delta configuration, and the first stator system has a higher impedance than the second stator system based on a number of windings in the first stator system and a number of windings in the second stator system, wherein the first stator system is configured to use a lower voltage on average and higher currents on average than the second stator system; and a transfer circuit electrically coupling a star point of the first stator system in the star configuration to a higher potential of the second onboard electrical sub-system, the transfer circuit being disposed along an electrical path connecting the star point of the first stator system to a higher potential of the second inverter.

2. The vehicle according to claim 1, wherein:
the transfer circuit comprises a first diode and a second diode, the first diode and the second diode being counter-switched and connected in series.

3. The vehicle according to claim 2, wherein:
the transfer circuit comprises a first switch connected in parallel with the first diode.

4. The vehicle according to claim 3, wherein:
the first inverter has three high-side switches and three low-side switches,
the second inverter has three high-side switches and three low-side switches,
the three high-side switches of the first inverter and the three low-side switches of the first inverter are controllable via pulse-width modulation,
the three high-side switches of the second inverter and the three low-side switches of the second inverter are controllable via pulse-width modulation, and
the electrical machine is operable as a motor or a generator when the first switch is open or if the second switch is open, and the electrical machine is operable in a mixed mode via pulse-width modulation control of the high-side switches and the low-side switches of the first and second inverters.

5. The vehicle according to claim 3, wherein:
the first nominal voltage exceeds the second nominal voltage in a higher nominal voltage direction, and
when the rotor of the electrical machine is stationary, the electrical machine is operable as a DC step-down converter between the first onboard electrical sub-system and the second onboard electrical sub-system.

6. The vehicle according to claim 2, wherein:
the transfer circuit comprises a second switch connected in parallel with the first diode.

7. The vehicle according to claim 6, wherein:
the first inverter has three high-side switches and three low-side switches,
the second inverter has three high-side switches and three low-side switches,
the three high-side switches of the first inverter and the three low-side switches of the first inverter are controllable via pulse-width modulation,
the three high-side switches of the second inverter and the three low-side switches of the second inverter are controllable via pulse-width modulation, and
the electrical machine is operable as a motor or a generator when the first switch is open or if the second switch is open, and the electrical machine is operable in a mixed mode via pulse-width modulation control of the high-side switches and the low-side switches of the first and second inverters.

8. The vehicle according to claim 6, wherein:
the first nominal voltage exceeds the second nominal voltage in a higher nominal voltage direction, and
when the rotor of the electrical machine is stationary, the electrical machine is operable as a DC step-down converter between the first onboard electrical sub-system and the second onboard electrical sub-system.

9. The vehicle according to claim 6, wherein:
the first nominal voltage exceeds the second nominal voltage in a higher nominal voltage direction, and
when the rotor of the electrical machine is stationary, the electrical machine is operable as a DC step-up converter from the second onboard electrical sub-system to the first onboard electrical sub-system.

10. The vehicle according to claim 2, wherein:
the transfer circuit comprises a first switch connected in parallel with the first diode, and
the transfer circuit comprises a second switch connected in parallel with the first diode.

11. The vehicle according to claim 10, wherein:
the first inverter has three high-side switches and three low-side switches,
the second inverter has three high-side switches and three low-side switches,
the three high-side switches of the first inverter and the three low-side switches of the first inverter are controllable via pulse-width modulation,
the three high-side switches of the second inverter and the three low-side switches of the second inverter are controllable via pulse-width modulation, and
the electrical machine is operable as a motor or generator when the first switch is open and if the second switch is open, or the electrical machine is operable in a mixed mode through pulse width-modulated control of the high-side switches and low-side switches of the first and second inverters.

12. The vehicle according to claim 10, wherein:
the first nominal voltage exceeds the second nominal voltage in a higher nominal voltage direction, and
when the rotor of the electrical machine is stationary, the electrical machine is operable as a DC step-down converter between the first onboard electrical sub-system and the second onboard electrical sub-system.

13. The vehicle according to claim 2, wherein the transfer circuit comprises only one switch, which is connected in parallel with the first diode.

14. The vehicle according to claim 1, wherein the second stator system is in the delta configuration and the transfer circuit is connected between the star point of the first stator system and a delta point in the second stator system.

15. A method of operating a vehicle comprising:
a multi-phase electrical machine, the multi-phase electrical machine comprising a rotor, a first stator system and a second stator system;
a first onboard electrical sub-system having a first nominal DC voltage;
a second onboard electrical sub-system having a second nominal DC voltage;
wherein the first onboard electrical sub-system comprises a first inverter with a first link capacitor, the first stator system being associated with the first inverter;

wherein the second onboard electrical sub-system comprises a second inverter with a second link capacitor, the second stator system being associated with the second inverter;
wherein the first stator system is in a star configuration, the second stator system is in a star or delta configuration, and the first stator system has a higher impedance than the second stator system based on a number of windings in the first stator system and a number of windings in the second stator system, wherein the first stator system is configured to use a lower voltage on average and higher currents on average than the second stator system; and
a transfer circuit electrically coupling a star point of the first stator system in the star configuration to a higher potential of the second onboard electrical sub-system, the transfer circuit being disposed along an electrical path connecting the star point of the first stator system to a higher potential of the second inverter, wherein
the transfer circuit comprises a first diode and a second diode, the first diode and the second diode being counter-switched and connected in series,
the transfer circuit comprises a first switch connected in parallel with the first diode,
the first nominal voltage exceeds the second nominal voltage in a higher nominal voltage direction, and
when the rotor of the electrical machine is stationary, the electrical machine is operable as a DC step-down converter between the first onboard electrical sub-system and the second onboard electrical sub-system, the method comprising the acts of:
opening the low-side switches of the second inverter;
opening the high-side switches of the second inverter;
opening the low-side switches of the first inverter;
controlling, via pulse-width modulation, the high-side switches of the first inverter to operate the electrical machine as the DC step-down converter.

16. The method according to claim 15, further comprising the act of short-circuiting the rotor so that it remains stationary during operation of the electrical machine as the DC step-down converter.

17. A method of operating a vehicle comprising:
a multi-phase electrical machine, the multi-phase electrical machine comprising a rotor, a first stator system and a second stator system;
a first onboard electrical sub-system having a first nominal DC voltage;
a second onboard electrical sub-system having a second nominal DC voltage;
wherein the first onboard electrical sub-system comprises a first inverter with a first link capacitor, the first stator system being associated with the first inverter;
wherein the second onboard electrical sub-system comprises a second inverter with a second link capacitor, the second stator system being associated with the second inverter;
wherein the first stator system is in a star configuration, the second stator system is in a star or delta configuration, and the first stator system has a higher impedance than the second stator system based on a number of windings in the first stator system and a number of windings in the second stator system, wherein the first stator system is configured to use a lower voltage on average and higher currents on average than the second stator system; and
a transfer circuit electrically coupling a star point of the first stator system in the star configuration to a higher potential of the second onboard electrical sub-system, the transfer circuit being disposed along an electrical path connecting the star point of the first stator system to a higher potential of the second inverter, wherein
the transfer circuit comprises a first diode and a second diode, the first diode and the second diode being counter-switched and connected in series,
the transfer circuit comprises a second switch connected in parallel with the first diode,
the first nominal voltage exceeds the second nominal voltage in a higher nominal voltage direction, and
when the rotor of the electrical machine is stationary, the electrical machine is operable as a DC step-up converter from the second onboard electrical sub-system to the first onboard electrical sub-system, the method comprising the acts of:
opening the low-sides switches of the second inverter;
opening the high-sides switches of the second inverter;
opening the low-sides switches of the first inverter;
controlling, via pulse-width modulation, the low-side switches of the first inverter to operate the electrical machine as the DC step-up converter.

18. The method according to claim 17, further comprising the act of short-circuiting the rotor so that it remains stationary during operation of the electrical machine as the DC step-up converter.

* * * * *